United States Patent
Asikainen et al.

(10) Patent No.: US 8,521,759 B2
(45) Date of Patent: Aug. 27, 2013

(54) TEXT-BASED FUZZY SEARCH

(75) Inventors: Joonas Asikainen, Zurich (CH); Brian Kenneth Vogel, Santa Clara, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 0 days.

(21) Appl. No.: 13/113,484

(22) Filed: May 23, 2011

(65) Prior Publication Data

US 2012/0303663 A1  Nov. 29, 2012

(51) Int. Cl.
*G06F 17/30* (2006.01)
*G06F 7/00* (2006.01)

(52) U.S. Cl.
USPC ........... 707/758; 707/769; 707/776; 707/780; 706/1; 706/2; 706/45; 706/46; 706/52

(58) Field of Classification Search
None
See application file for complete search history.

(56) References Cited

U.S. PATENT DOCUMENTS

| | | | |
|---|---|---|---|
| 7,328,153 B2 * | 2/2008 | Wells et al. | 704/231 |
| 7,881,931 B2 * | 2/2011 | Wells et al. | 704/243 |
| 2003/0086341 A1 * | 5/2003 | Wells et al. | 369/13.56 |
| 2007/0192352 A1 * | 8/2007 | Levy | 707/102 |
| 2008/0201140 A1 * | 8/2008 | Wells et al. | 704/231 |
| 2011/0295896 A1 * | 12/2011 | Klein et al. | 707/780 |

* cited by examiner

*Primary Examiner* — Angelica Ruiz
(74) *Attorney, Agent, or Firm* — Inventive Patent Law P.C.; Jim H. Salter (57) ABSTRACT

An input feature vector is computed from an input text record, the input feature vector comprising one or more features, each feature including a subsequence of characters and a frequency of occurrence of the associated subsequence. A input fingerprint is generated out of the input feature vector by choosing one or more features with non-zero frequencies and alphabetizing the features chosen. One or more input indices are generated by alphabetizing features in the input fingerprint and concatenating features occurring in subsequent locations of the input fingerprint. The input text record is matched against a target text record if (1) one or more of the input indices match a target index corresponding to the target text record and (2) the corresponding input fingerprint matches a target fingerprint corresponding to the target text record. The target text record is outputted as a search result if it matches the input text record.

21 Claims, 4 Drawing Sheets

TEXT-BASED FUZZY SEARCH

BACKGROUND

1. Field

Example aspects of the present invention generally relate to text-based searching, and more particularly to a text-based fuzzy search.

2. Related Art

Text-based searching is commonly used to match input text to documents or data which contain similar text. For example, a search engine might match a user's input text with websites containing such text. In order to increase the number of search results and to account for text anomalies such as typographical errors, some text-based searching methods are "fuzzy", in that the search returns results which may not exactly match the input text, but contain text similar to the input text.

Existing fuzzy search methodologies roughly divide into (1) phoneme-based approaches and (2) multi-gram based approaches, both of which have drawbacks. Phoneme-based approaches are not language-agnostic, and therefore are confined to a particular language or set of languages for which phonetic knowledge is available. Meanwhile, multi-grams produce very space-consuming indices, and therefore tend to either not be very robust (in the case of long multi-grams) or link to too many records (short multi-grams).

BRIEF DESCRIPTION

The example embodiments described herein address the foregoing by providing systems, apparatuses, methods, and computer program products for performing a text-based fuzzy search. An input text record is received. An input feature vector is computed from the input text record, the input feature vector comprising one or more features, each feature including a subsequence of characters and a frequency of occurrence of the associated subsequence. A input fingerprint is generated out of the input feature vector by choosing one or more features with non-zero frequencies and alphabetizing the features chosen. One or more input indices are generated by alphabetizing a plurality of features in the input fingerprint and concatenating features occurring in subsequent locations of the input fingerprint. The input text record is matched against a target text record if (1) one or more of the input indices match a target index corresponding to the target text record and (2) the corresponding input fingerprint matches a target fingerprint corresponding to the target text record. The target text record is outputted as a search result if it matches the input text record. Optionally, a supplementary string matching (such as the Edit distance) may be performed.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

DETAILED DESCRIPTION

I. Overview

The example embodiments of the invention presented herein are directed to apparatuses, methods, and computer program products for fuzzy text-based searching in an environment using consumer devices in conjunction with one or more remote databases. This description is not intended to limit the application of the example embodiments presented herein. In fact, after reading the following description, it will be apparent to one skilled in the relevant art(s) how to implement the following example embodiments in alternative environments, such as a services-based environment, a web services-based environment, etc.

II. Definitions

Some terms are defined below for easy reference. However, it should be understood that the defined terms are not rigidly restricted to their definitions. A term may be further defined by its use in other sections of this description.

"Album" means a collection of tracks. An album is typically originally published by an established entity, such as a record label (e.g., a recording company such as Warner Brothers and Universal Music).

"Attribute" means a metadata item corresponding to a particular characteristic of a portion of content. Each attribute falls under a particular attribute category. Examples of attribute categories and associated attributes for music include cognitive attributes (e.g., simplicity, storytelling quality, melodic emphasis, vocal emphasis, speech like quality, strong beat, good groove, fast pace), emotional attributes (e.g., intensity, upbeatness, aggressiveness, relaxing, mellowness, sadness, romance, broken heart), aesthetic attributes (e.g., smooth vocals, soulful vocals, high vocals, sexy vocals, powerful vocals, great vocals), social behavioral attributes (e.g., easy listening, wild dance party, slow dancing, workout, shopping mall), genre attributes (e.g., alternative, blues, country, electronic/dance, folk, gospel, jazz, Latin, new age, R&B/soul, rap/hip hop, reggae, rock), sub genre attributes (e.g., blues, gospel, motown, stax/memphis, philly, doo wop, funk, disco, old school, blue eyed soul, adult contemporary, quiet storm, crossover, dance/techno, electro/synth, new jack swing, retro/alternative, hip hop, rap), instrumental/vocal attributes (e.g., instrumental, vocal, female vocalist, male vocalist), backup vocal attributes (e.g., female vocalist, male vocalist), instrument attributes (e.g., most important instrument, second most important instrument), etc.

Examples of attribute categories and associated attributes for video content include genre (e.g., action, animation, children and family, classics, comedy, documentary, drama, faith and spirituality, foreign, high definition, horror, independent, musicals, romance, science fiction, television, thrillers), release date (e.g., within past six months, within past year, 1980s), scene type (e.g., foot-chase scene, car-chase scene, nudity scene, violent scene), commercial break attributes (e.g., type of commercial, start of commercial, end of commercial), actor attributes (actor name, scene featuring actor), soundtrack attributes (e.g., background music occurrence, background song title, theme song occurrence, theme song title), interview attributes (e.g., interviewer, interviewee, topic of discussion), etc.

Other attribute categories and attributes are contemplated and are within the scope of the embodiments described herein.

"Audio Fingerprint" (e.g., "fingerprint", "acoustic fingerprint", "digital fingerprint") is a digital measure of certain acoustic properties that is deterministically generated from an audio signal that can be used to identify an audio sample and/or quickly locate similar items in an audio database. An audio fingerprint typically operates as a unique identifier for a particular item, such as, for example, a CD, a DVD and/or a Blu-ray Disc. An audio fingerprint is an independent piece of data that is not affected by metadata. Rovi™ Corporation has databases that store over 25 million unique fingerprints for various audio samples. Practical uses of audio fingerprints include without limitation identifying songs, identifying records, identifying melodies, identifying tunes, identifying advertisements, monitoring radio broadcasts, monitoring multipoint and/or peer-to-peer networks, managing sound effects libraries and identifying video files.

"Audio Fingerprinting" is the process of generating an audio fingerprint. U.S. Pat. No. 7,277,766, entitled "Method and System for Analyzing Digital Audio Files," which is herein incorporated by reference in its entirety, provides an example of an apparatus for audio fingerprinting an audio waveform. U.S. Pat. No. 7,451,078, entitled "Methods and Apparatus for Identifying Media Objects," which is herein incorporated by reference in its entirety, provides an example of an apparatus for generating an audio fingerprint of an audio recording. U.S. patent applicaiton Ser. No. 12/686,779, entitled "Rolling Audio Recognition," which is herein incorporated by reference in its entirety, provides an example of an apparatus for performing rolling audio recognition of recordings. U.S. patent application Ser. No. 12/686,804, entitled "Multi-Stage Lookup for Rolling Audio Recognition," which is herein incorporated by reference in its entirety, provides an example of performing a multi-stage lookup for rolling audio recognition.

"Blu-ray" and "Blu-ray Disc" mean a disc format jointly developed by the Blu-ray Disc Association, and personal computer and media manufacturers including Apple, Dell, Hitachi, HP, JVC, LG, Mitsubishi, Panasonic, Pioneer, Philips, Samsung, Sharp, Sony, TDK and Thomson. The format was developed to enable recording, rewriting and playback of high-definition (HD) video, as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (about 405 nm) is that it has a shorter wavelength than a red or infrared laser (about 650-780 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have substantially similar physical dimensions as a traditional CD or DVD.

"Chapter" means an audio and/or video data block on a disc, such as a Blu-ray Disc, a CD or a DVD. A chapter stores at least a portion of an audio and/or video recording.

"Compact Disc" (CD) means a disc used to store digital data. The CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is about 650-780 nm, and thus the light of a standard CD laser typically has a red color.

"Consumer," "data consumer," and the like, mean a consumer, user, client, and/or client device in a marketplace of products and/or services.

"Content," "media content," "content data," "multimedia content," "program," "multimedia program," and the like are generally understood to include music albums, television shows, movies, games, videos, and broadcasts of various types. Similarly, "content data" refers to the data that includes content. Content (in the form of content data) may be stored on, for example, a Blu-Ray Disc, Compact Disc, Digital Video Disc, floppy disk, mini disk, optical disc, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device.

"Content fingerprint" means an audio fingerprint and/or a video fingerprint.

"Content information," "content metadata," and the like refer to data that describes content and/or provides information about content. Content information may be stored in the same (or neighboring) physical location as content (e.g., as metadata on a music CD or streamed with streaming video) or it may be stored separately.

"Content source" means an originator, provider, publisher, distributor and/or broadcaster of content. Example content sources include television broadcasters, radio broadcasters, Web sites, printed media publishers, magnetic or optical media publishers, and the like.

"Content stream," "data stream," "audio stream," "video stream," "multimedia stream" and the like means data that is transferred at a rate sufficient to support such applications that play multimedia content. "Content streaming," "data streaming," "audio streaming," "video streaming," "multimedia streaming," and the like mean the continuous transfer of data across a network. The content stream can include any form of content such as broadcast, cable, Internet or satellite radio and television, audio files, video files.

"Data correlation," "data matching," "matching," and the like refer to procedures by which data may be compared to other data.

"Data object," "data element," "dataset," and the like refer to data that may be stored or processed. A data object may be composed of one or more attributes ("data attributes"). A table, a database record, and a data structure are examples of data objects.

"Database" means a collection of data organized in such a way that a computer program may quickly select desired pieces of the data. A database is an electronic filing system. In some implementations, the term "database" may be used as shorthand for "database management system."

"Data structure" means data stored in a computer-usable form. Examples of data structures include numbers, characters, strings, records, arrays, matrices, lists, objects, containers, trees, maps, buffer, queues, matrices, look-up tables, hash lists, booleans, references, graphs, and the like.

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk.

"Digital Video Disc" (DVD) means a disc used to store digital data. The DVD was originally developed for storing digital video and digital audio data. Most DVDs have substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is about 605-650 nm, and thus the light of a standard DVD laser typically has a red color.

"Fuzzy search," "fuzzy string search," and "approximate string search" mean a search for text strings that approximately or substantially match a given text string pattern. Fuzzy searching may also be known as approximate or inexact matching. An exact match may inadvertently occur while performing a fuzzy search.

"Link" means an association with an object or an element in memory. A link is typically a pointer. A pointer is a variable that contains the address of a location in memory. The location is the starting point of an allocated object, such as an object or value type, or the element of an array. The memory may be located on a database or a database system. "Linking" means associating with, or pointing to, an object in memory.

"Metadata" means data that describes data. More particularly, metadata may be used to describe the contents of recordings. Such metadata may include, for example, a track name, a song name, artist information (e.g., name, birth date, discography), album information (e.g., album title, review, track listing, sound samples), relational information (e.g., similar artists and albums, genre) and/or other types of supplemental information such as advertisements, links or programs (e.g., software applications), and related images. Other examples of metadata are described herein. Metadata may also include a program guide listing of the songs or other audio content associated with multimedia content. Conventional optical discs (e.g., CDs, DVDs, Blu-ray Discs) do not typically contain metadata. Metadata may be associated with a recording (e.g., a song, an album, a video game, a movie, a video, or a broadcast such as a radio, television or Internet broadcast) after the recording has been ripped from an optical disc, converted to another digital audio format and stored on a hard drive. Metadata may be stored together with, or separately from, the underlying data that is described by the metadata.

"Network" means a connection between any two or more computers, which permits the transmission of data. A network may be any combination of networks, including without limitation the Internet, a network of networks, a local area network (e.g., home network, intranet), a wide area network, a wireless network and a cellular network.

"Occurrence" means a copy of a recording. An occurrence is preferably an exact copy of a recording. For example, different occurrences of a same pressing are typically exact copies. However, an occurrence is not necessarily an exact copy of a recording, and may be a substantially similar copy. A recording may be an inexact copy for a number of reasons, including without limitation an imperfection in the copying process, different pressings having different settings, different copies having different encodings, and other reasons. Accordingly, a recording may be the source of multiple occurrences that may be exact copies or substantially similar copies. Different occurrences may be located on different devices, including without limitation different user devices, different MP3 players, different databases, different laptops, and so on. Each occurrence of a recording may be located on any appropriate storage medium, including without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device. Occurrences may be compiled, such as in a database or in a listing.

"Pressing" (e.g., "disc pressing") means producing a disc in a disc press from a master. The disc press preferably produces a disc for a reader that utilizes a laser beam having a wavelength of about 650-780 nm for CD, about 605-650 nm for DVD, about 405 nm for Blu-ray Disc or another wavelength as may be appropriate.

"Program," "multimedia program," "show," and the like include video content, audio content, applications, animations, and the like. Video content includes television programs, movies, video recordings, and the like. Audio content includes music, audio recordings, podcasts, radio programs, spoken audio, and the like. Applications include code, scripts, widgets, games and the like. The terms "program," "multimedia program," and "show" include scheduled content (e.g., broadcast content and multicast content) and unscheduled content (e.g., on-demand content, pay-per-view content, downloaded content, streamed content, and stored content).

"Recording" means media data for playback. A recording is preferably a computer readable recording and may be, for example, a program, a music album, a television show, a movie, a game, a video, a broadcast of various types, an audio track, a video track, a song, a chapter, a CD recording, a DVD recording and/or a Blu-ray Disc recording, among other things.

"Server" means a software application that provides services to other computer programs (and their users), in the same or another computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Signature" means an identifying means that uniquely identifies an item, such as, for example, a track, a song, an album, a CD, a DVD and/or Blu-ray Disc, among other items. Examples of a signature include without limitation the following in a computer-readable format: an audio fingerprint, a portion of an audio fingerprint, a signature derived from an audio fingerprint, an audio signature, a video signature, a disc signature, a CD signature, a DVD signature, a Blu-ray Disc signature, a media signature, a high definition media signature, a human fingerprint, a human footprint, an animal fingerprint, an animal footprint, a handwritten signature, an eye print, a biometric signature, a retinal signature, a retinal scan, a DNA signature, a DNA profile, a genetic signature and/or a genetic profile, among other signatures. A signature may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain signatures may not initially be computer-readable. For example, latent human fingerprints may be printed on a door knob in the physical world. A signature that is initially not computer-readable may be converted into a computer-readable signature by using any appropriate conversion technique. For example, a conversion technique for converting a latent human fingerprint into a computer-readable signature may include a ridge characteristics analysis.

"Software" and "application" mean a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++, and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Song" means a musical composition. A song is typically recorded onto a track by a record label (e.g., recording company). A song may have many different versions, for example, a radio version and an extended version.

"System" means a device or multiple coupled devices. A device is defined above.

A "tag" means an item of metadata, such as an item of time-localized metadata.

"Tagging" means associating at least a portion of content with metadata, for instance, by storing the metadata together with, or separately from, the portion of content described by the metadata.

"Theme song" means any audio content that is a portion of a multimedia program, such as a television program, and that recurs across multiple occurrences, or episodes, of the multimedia program. A theme song may be a signature tune, song, and/or other audio content, and may include music, lyrics, and/or sound effects. A theme song may occur at any time during the multimedia program transmission, but typically plays during a title sequence and/or during the end credits.

"Time-localized metadata" means metadata that describes, or is applicable to, a portion of content, where the metadata includes a time span during which the metadata is applicable. The time span can be represented by a start time and end time, a start time and a duration, or any other suitable means of representing a time span.

"Track" means an audio/video data block. A track may be on a disc, such as, for example, a Blu-ray Disc, a CD or a DVD.

"User device" (e.g., "client", "client device", "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a television (TV), a CD player, a DVD player, a Blu-ray Disc player, a personal media device, a portable media player, an iPod™, a Zoom Player, a laptop computer, a palmtop computer, a smart phone, a cell phone, a mobile phone, an MP3 player, a digital audio recorder, a digital video recorder (DVR), a set top box (STB), a network attached storage (NAS) device, a gaming device, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation Mozilla Firefox™ and Microsoft Internet Explorer™.

"Web page" means any documents written in mark-up language including without limitation HTML (hypertext mark-up language) or VRML (virtual reality modeling language), dynamic HTML, XML (extensible mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

III. System

Figure 1:
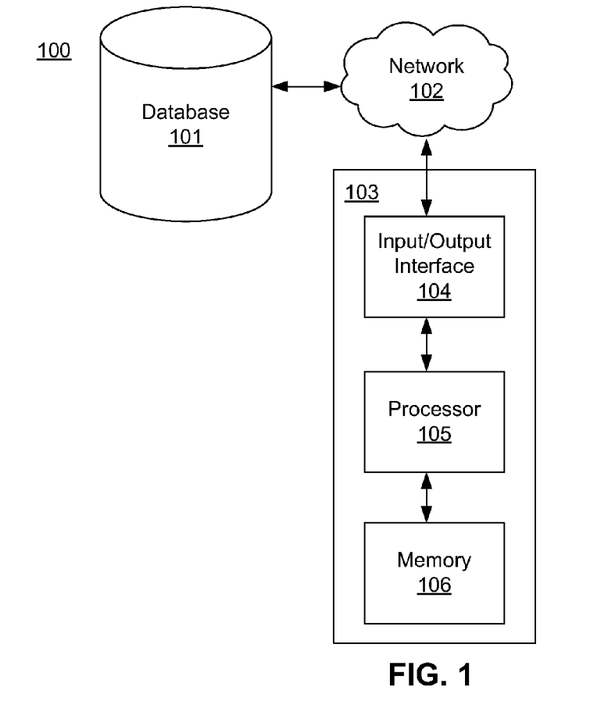
FIG. 1 is a diagram of a system for a text-based fuzzy search in which some embodiments are implemented.

FIG. 1 is a diagram of a system 100 for performing a text-based fuzzy search. System 100 includes one or more database(s) 101 of text data corresponding to objects which may be a target of a search, such website content, website names, headings, TV program titles, song titles, artist names, or document data such as books, among many others. Database 101 is connected to search system 103, via communication network 102, such as an Internet Protocol (IP) network. Examples of database 101 include a remote server, a remote home PC, a remote device functioning as a representative for devices on the network or in a computing cloud, a remote mobile device, and the like.

Search system 103 includes input/output interface 104, which is communicatively coupled to, and provides bi-directional communication capability between the database 101 and processor 105 via communication network 102. Text data such as search results are transmitted via network 102, are received by input/output interface 104 and are forwarded to processor 105 for processing.

Processor 105 is also communicatively coupled to memory 106, which contains program instructions that processor 105 executes to perform, among other tasks, functions associated with performing a text-based fuzzy search. Example functions stored in memory 106 and executed by processor 105 include receiving, transmitting, copying, and/or comparing fingerprints and indices, generating fingerprints and indices from input text, performing searches, etc.

Memory 106 may also store input text data, such as text data of a search query. In some embodiments, memory 106 might further store targets of a search query, of the same nature as those stored in database 101.

Processor 105 computes an input feature vector comprising one or more features. Each feature comprises a subsequence of characters in input text, and a frequency of occurrence of the associated subsequence of characters in the text. In that regard, characters in text may include alphanumeric characters such as letters and numbers, as well as other symbols.

Processor 105 further generates an input fingerprint from the input feature vector and generates one or more input indices in order to search for a corresponding text record, as described more fully below.

IV. Process

Figure 2:
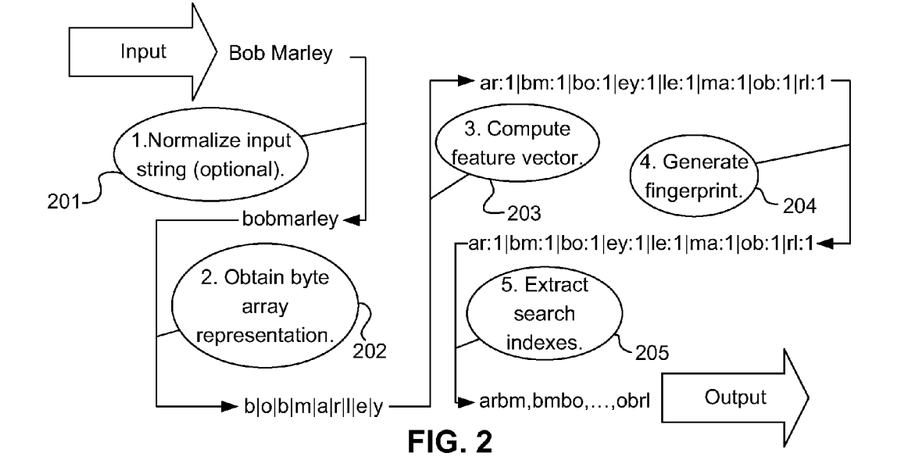
FIG. 2 is a flowchart diagram showing an exemplary procedure for generating a feature vector, a fingerprint, and an index from input text.

FIG. 2 is a flowchart diagram showing an exemplary procedure 200 for generating a feature vector, a fingerprint, and an index from input text. Briefly, an input feature vector is computed, and the input feature vector comprises one or more features. Each feature includes a subsequence of characters and a frequency of occurrence of the associated subsequence of characters. One or more input indices are generated by alphabetizing a plurality of input fingerprints corresponding to each input feature vector and concatenating features occurring in subsequent locations of each input fingerprint.

In that regard, the fingerprint and index generation could be performed locally at the device receiving or inputting the text record, or could be performed remotely at another device such as a server.

The processes in FIG. 2 will be described more fully below.

A. Creating a Feature Vector

In step 201, an input text string is received and, optionally, normalized by lower-casing all characters and removing any whitespace or punctuation characters. The input text string could be, for example, text typed by a user into a search window of a search engine, in order to search for websites or other objects containing similar text. In the example shown in FIG. 2, the string "Bob Marley" is inputted, and then normalized to the string "bobmarley".

In step 202, the input text is converted into a byte array representation, prior to computation of a feature vector. In the example shown in FIG. 2, the byte array representation for ASCII text is equivalent to the corresponding substring of the text string, as each character is representable by a single byte.

Other byte array representations of an input string are possible. In Unicode text, for example, one could reduce the number of features by only considering the bytes at the character boundaries. Thus, for example, for two subsequent Unicode characters, the feature might include only the last byte of the first character and the first byte of the second character.

A "feature" is a subsequence of the byte array representation, of a length larger than one. More specifically, a feature consisting of N subsequent bytes can be called an N-feature. In the example of FIG. 2, N is equal to 2, that is, each feature is two characters. More specifically, in the example of FIG. 2, each feature comprises two subsequent characters in the string "bobmarley" (e.g., bo, ob, bm, etc.). Of course, larger features are possible, but small values of N may generally be more useful for increasing search robustness.

Turning to step 203, a feature vector is generated by organizing the features generated from the input text record into alpha-numeric order, together with a respective frequency count for each feature indicating how many times that feature appears in the input text record. Thus, in the example of FIG. 2, each feature comprises subsequent characters in the string "bobmarley" (e.g., bo, ob, bm, etc.), together with a respective frequency of the occurrence of those particular characters.

For example, consider an example of two strings, "Bob Marley" as shown in FIG. 2, and another text string, a misspelled version "Bobby Maley". As described above, the normalized first 2-features of the string "Bob Marley" are "bo" and "ob". Table 1 lists, in alphabetical order, all features from both strings "Bob Marley" and "Bobby Maley", together with a frequency count indicating how many times the feature is seen in either of the strings.

TABLE 1

Features extracted from strings "Bob Marley" and "Bobby Maley"

| Feature | Frequency in "Bob Marley" | Frequency in "Bobby Maley" |
|---|---|---|
| al | 0 | 1 |
| ar | 1 | 0 |
| bb | 0 | 1 |
| bm | 1 | 0 |
| bo | 1 | 1 |
| by | 0 | 1 |
| ey | 1 | 1 |
| le | 1 | 1 |
| ma | 1 | 1 |
| ob | 1 | 1 |
| rl | 1 | 0 |
| ym | 0 | 1 |

Taking only those features which actually occur in each string (e.g., those with non-zero frequency counts) and keeping alphabetic order, the feature vector for "Bob Marley" is shown below in Table 2, whereas the feature vector for "Bobby Maley" is shown in Table 3.

TABLE 2

Feature Vector corresponding to "Bob Marley"

| ar | 1 |
| bm | 1 |
| bo | 1 |
| ey | 1 |
| le | 1 |
| ma | 1 |
| ob | 1 |
| rl | 1 |

TABLE 3

Feature Vector corresponding to "Bobby Maley"

| al | 1 |
| bb | 1 |
| bo | 1 |
| by | 1 |
| ey | 1 |
| le | 1 |

Each feature vector is used to create fingerprints for the text, as discussed more fully below.

While FIG. 2 depicts the input text as a character string for illustrative purposes, it may be possible to enable faster processing by mapping the subsequences of characters of the byte array to an integer representation. Moreover, by creating appropriate unique integer-valued mapping from byte subsequences, the alphanumeric sorting is automatically generated, reducing the overall processing time. Additionally, as the possible range of integer values for the features is known, it is possible to use a fixed-size array for computing frequency counts, which results in fast processing time. Such sorting can also be used in creating search indices as described more fully below; if two text strings are similar, they likely have pairs or triples, etc. of features with non-zero frequency accounts in the same alphanumeric order.

An alphanumerically sorted feature vector, particularly one having features comprising short subsequences of characters as in FIG. 2, can provide a number of advantages. In particular, it is ordinarily possible to accurately compare feature vectors from different text records using the relative frequency counts. The relative frequency counts, in turn, can be used to create fingerprints which encode the essence of the input text in a compact way and can be used for fast string similarity estimation, as described below. The fingerprints, in turn, can be used to generate unique yet robust indices for fuzzy text search applications, as also described below. In addition, short subsequences provide a robust way of inexactly matching two strings, as larger subsequences (e.g., trying to match 4 characters between strings) might often result in zero match results between two strings which are similar but not exactly the same.

B. Creating Fingerprints

Returning to FIG. 2, in step 204, a fingerprint is created from the feature vector for the string "Bob Marley". The fingerprint is generated by selecting one or more target features with non-zero frequencies.

A fingerprint is created from the feature vector in order to encode the feature vector in a compact form, particularly in the case in which the text record is long. Fingerprints can be used to quickly estimate the similarity between two strings, and to generate indices for a fuzzy text search. Both of these processes will be described more fully below.

In that regard, the format of a fingerprint may depend on the type of search being conducted, and in particular between short-text searches for names of TV programs, song titles, artist names and the like, and long-text searches for long text documents such as reviews, books and the like.

1. Short-text Fingerprints

For short-text searches, and in particular for short input text records, the feature vectors will typically only contain small frequency values for any feature (e.g., only one occurrence of "bo"). In such situations, it is usually sufficient to select all of the features with non-zero frequency for the fingerprint. In other words, it is often appropriate to use all of the features actually appearing in the text. The selected features are ordered in alphanumeric order along with their frequency amounts.

Thus, in a short-text situation in which all features with non-zero frequency are selected for the fingerprint, the fingerprint may be identical to the feature vector. For example, in the example of FIG. 2, the feature vector for the string "Bob Marley" shown in Table 2 is identical to the fingerprint for "Bob Marley" shown in FIG. 2. Similarly, the feature vector shown in Table 3 for the string "Bobby Maley" is identical to the fingerprint for "Bobby Maley".

Additionally, for short-text fingerprints, using N=2 subsequent bytes is generally an appropriate number for feature generation.

2. Long-Text Fingerprints

In longer input text records such as books or long articles, some features in the feature vector may have significantly high frequency counts. To constrain the fingerprint size and therefore reduce processing, only the most significant features from the feature vector may be used for each fingerprint. The most significant features can be determined based on the frequency counts for the features. For example, the K most frequently occurring features can be selected for the fingerprint. For instance, in the case that a respective target text record is over a set length threshold, only the K most frequently occurring features are selected for the fingerprint, with K being a number greater than 2. Alternatively, the mean or median of the frequency count can be computed, and all features above the mean or median can be selected for the fingerprint. Thus, in this instance, in the case that a respective target text record is over a set length threshold, a mean of the total frequency count is computed, and only features with frequencies above the mean are selected for the fingerprint. In either case, the K number of elements in the fingerprint correspond to the size of the fingerprint. The remaining selected features are sorted again in alphanumeric order, and together with their frequency counts form the fingerprint.

Additionally, for long-text records/fingerprints, one may want to increase N, the number of subsequent bytes used for the features, to a higher value such as 3 or 4 (e.g., "marl" instead of "ma"). By increasing this value, the features become more unique, and therefore decrease the chances of linking to text that does not actually match.

C. Fingerprint Matching

As mentioned above, fingerprints can be used to quickly estimate the similarity between two strings.

In that regard, two identical text records clearly form identical fingerprints. When either of the text records is modified, its associated fingerprint will start to differ from that of the other text record.

A matching procedure for two fingerprints can be implemented in $O(L)$ time with relatively small computational overhead, where L is the maximum number of features used in the fingerprints. For example, given two fingerprints Fp1 and Fp2, Fp1 can be mapped into an integer valued array. For fast feature vector computation, an array size of a size equal to the maximum N-feature size ($256^N$) could be used. Alternatively, a hash map could be constructed with keys being the features and the values being the frequencies. At any rate, the procedure could traverse through all of the feature/frequency pairs in Fp2 and determine which are present in Fp1. A match score can then be computed based on the frequency value differences. For instance, cosine similarity or squared differences of the respective frequency values, or Jaccard distance could be used.

For example, the strings "Bob Marley" and "Bobby Maley" would yield a value of 0.42 using Jaccard distance as the similarity measure, whereas cosine similarity would yield a similarity value of 0.59. These values can be verified by returning to Table 1. Specifically, in Table 1, there are 12 features that have non-zero frequencies in either text record, and there are 5 features that have non-zero frequencies in both text records. Either value (0.42 or 0.59) is significantly larger than zero, indicating a high potential string similarity. As a reference point, the Levenshtein distance between the actual strings is 3.

D. Creating Search Indices

Returning again to FIG. 2, in step 205, the fingerprint constructed from the feature vector is used to extract search indices. As described above, the N-features use N subsequent bytes out of the byte array representation of the input text. To generate each index, M subsequent (consecutive) features are extracted from the fingerprint, and the M extracted features are concatenated. Typically, it is appropriate to restrict M to a small value (e.g., 2 or 3).

An example index creation will be described with respect to as Table 1, Table 2 and Table 3 above, with M (the number of features to be concatenated) equal to 2. Starting with the fingerprint for "Bob Marley" shown in Table 2, consecutive pairs of features are concatenated. Thus, in the fingerprint shown in Table 2, features "ar", "bm", "bo", "ey", etc. lead to indices "arbm", "bmbo", "boey", etc. Similarly, using the fingerprint shown in Table 3 for the string "Bobby Maley", features "al", "bb", "bo", "by", etc. lead to indices "albb", "bbbo", "boby", etc.

As can be seen from Table 1, the features "ey", "le", "ma" and "ob" occur in both strings "Bob Marley" and "Bobby Maley" in subsequent locations. The indices corresponding to these features are "eyle", "lema", and "maob".

Thus, even though "Bobby Maley" is relatively distorted from "Bob Marley", there would still be three index matches.

Only one index match may be necessary to find candidates for more accurate matching using fingerprints as discussed above, or using some other string similarity computation.

Moreover, the index approach herein is generally computationally efficient, as the overall computational cost of creating the features, fingerprint and indices is O(length(text)).

E. Text Search Engine

The fuzzy text search indices and fingerprints explained above can be used to create a fuzzy text search engine.

Briefly, in constructing and searching the databases, one or more target text records are stored in a database, and respective target feature vectors are computed for each target text record. Each target feature vector comprises target features, each target feature including a subsequence of characters and a frequency of occurrence of the subsequence of characters. An index is generated for each target text record by alphabetizing a plurality of target fingerprints corresponding to each target vector and concatenating target features in subsequent locations of each target fingerprint. Each target fingerprint is stored in a fingerprint database and each target index is stored in an index database. An input text record is matched against a target text record if (1) one or more of the corresponding input indices match a target index corresponding to the target text record and (2) the corresponding input fingerprint matches a target fingerprint corresponding to the target text record.

In this regard, for purposes of clarity in differentiating search queries and search targets, text records, fingerprints and indices which have already been stored in the databases are referred to as "targets", to differentiate from a newly input text record functioning as a search query. In other words, since the already-stored text records, fingerprints and indices are thus eligible to be targets of a new search, an already-stored text record, fingerprint and index are referred to as "target text record", "target fingerprint" and "target index", respectively. Meanwhile, a newly input text record, such as a text record entered as search query, will be referred to as "input text record", and will result in generation of a "input fingerprint" and "input index".

1. Building the Search Database(s)

Figure 3:
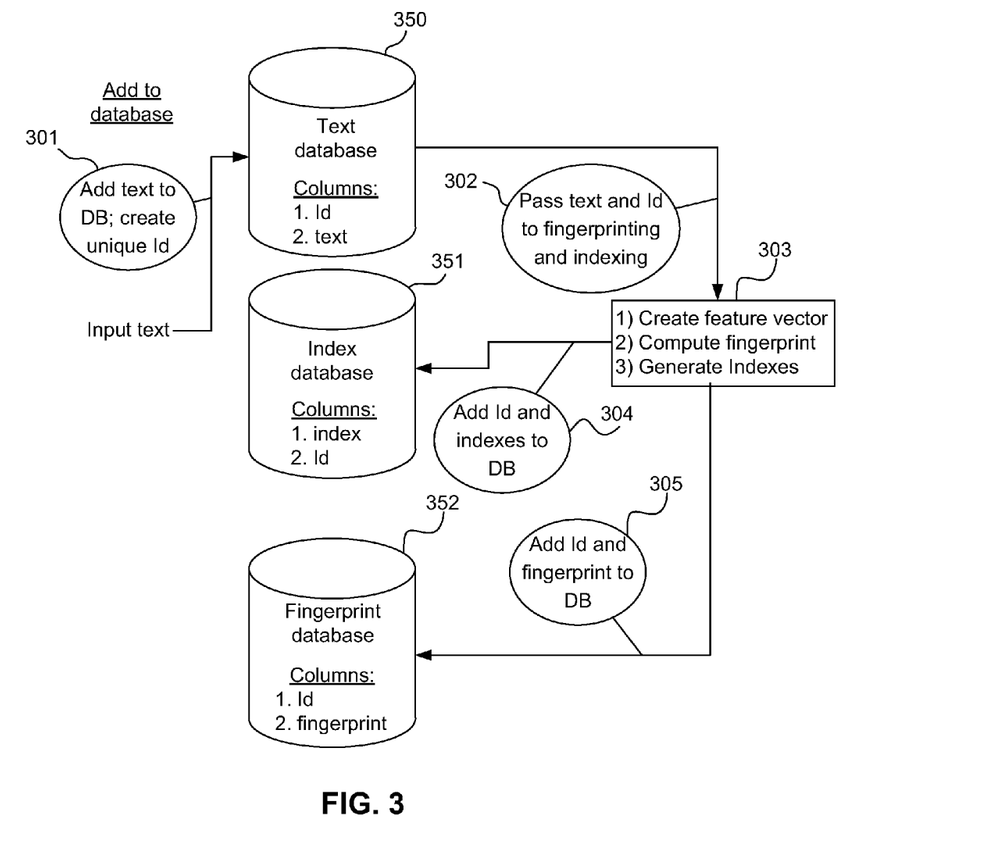
FIG. 3 is a flowchart diagram showing an exemplary procedure for building one or more search databases.

FIG. 3 is a flowchart diagram showing an exemplary procedure for building one or more search databases.

Briefly, to add an input text record to the database, one creates a fingerprint and search indices as described above. Meanwhile, the text record is added to a text database, and a unique identifier ("Id") is created for it. The fingerprint is added to a fingerprint database together with the Id corresponding to the input text record. Finally, all search indices generated for the text record are added to an index database together with the Id corresponding to the input text record.

In more detail, in step 301, a text record is inputted. The text is added to text database 350, which stores the text record along with a unique Id.

In step 302, the text record and Id are passed along to step 303 for fingerprinting and indexing.

In step 303, the text record is fingerprinted and indexed, so that the respective fingerprint and index can be stored in searchable databases as targets of search.

Thus, in building the databases, a target feature vector is computed for the text record, and the target feature vector comprises one or more target features. Each target feature includes a subsequence of characters and a frequency of occurrence of the associated subsequence of characters. A target fingerprint is generated from the target feature vector, and an index is generated for the text record by alphabetizing the respective target fingerprint and concatenating target features occurring in subsequent locations of the respective target fingerprint.

As a result, in step 304, the generated target index is stored in index database 351, along with the same Id used for the corresponding text record in text database 350.

In addition, in step 305, the generated target fingerprint is stored in fingerprint database 352, along with the Id used for the corresponding text record in text database 350.

Naturally, steps 301, 302, 303, 304 and 305 can be repeated as many times as necessary or desired to build up the respective databases. In addition, while FIG. 3. depicts text database 350, index database 351 and fingerprint database 352 as separate databases, text database 350, index database 351 and fingerprint database 352 could also be joined as one physical and/or logical database.

2. Searching the Database(s)

Once the databases are built, the databases can be searched for target records corresponding to input text.

Figure 4:
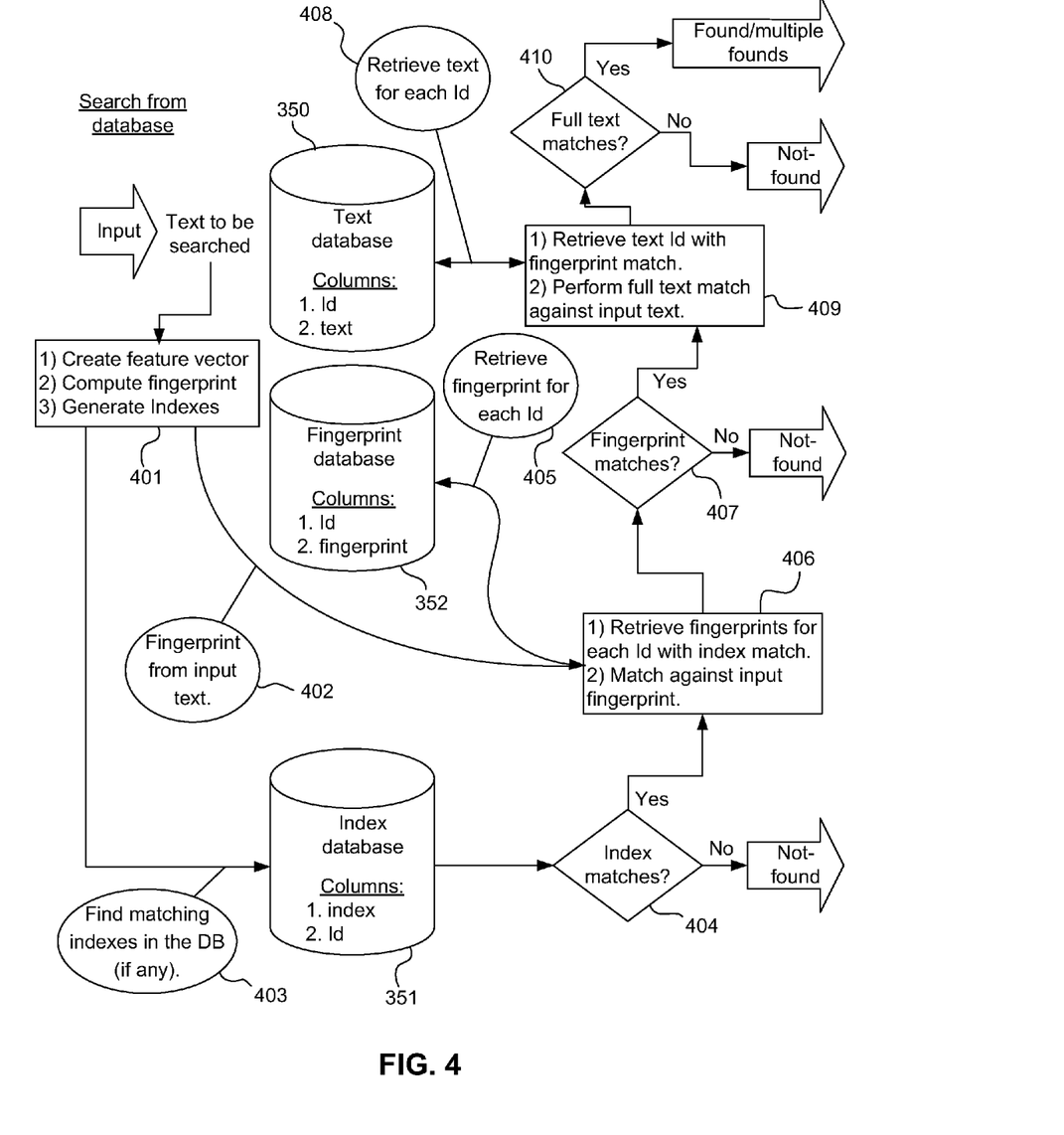
FIG. 4 is a flowchart diagram showing an exemplary procedure for performing a fuzzy text-based search.

FIG. 4 is a flowchart diagram showing an exemplary procedure for performing a fuzzy text-based search.

In this regard, a fingerprint and an index are created for input text (e.g., a text search query), using the methods described above. Thus, an input feature vector comprising one or more features is computed from input text, each feature including a subsequence of characters and a frequency of occurrence of the associated subsequence of characters. An input fingerprint is generated from the input feature vector by selecting one or more features with non-zero frequencies, and one or more input indices are generated by alphabetizing the input fingerprint and concatenating features occurring in subsequent locations of the fingerprint.

Briefly, the search can be ordered as follows. The index database is queried for indices matching the input index. If no index matches are found, a "Not Found" is returned. If index matches are found, the corresponding fingerprints are retrieved from the fingerprint database. A fingerprint match is computed between the input fingerprint and the fingerprints corresponding to database records that had index matches. If no fingerprint matches are found, a "Not Found" is returned. If fingerprint matches are found, the text record corresponding to each database record with a fingerprint match is retrieved, and an appropriate full text matching is performed against the input text. Depending on the results from full text matching, either zero, one or more matches are returned.

In more detail, in step 401, the text to be searched for is inputted, and there is generation of a feature vector ("an input feature vector"), a fingerprint for the input text (the "input fingerprint") and indices for the input text ("input indices").

In step 402, the fingerprint for the input fingerprint is passed to step 406 for subsequent use if any indices yield a match.

In step 403, there is a determination of whether the input index matches any of the indices in index database 351.

In step 404, if there is a determination that none of the indices in index database 351 match the input index, a "Not-found" is outputted. Meanwhile, if there is a determination that at least one of the indices in index database 351 matches the input index, the process proceeds to step 405.

In step 405, upon the determination that at least one of the indices in index database 351 matches the input index, fingerprints are retrieved from fingerprint database 352 corresponding to each Id of a text record that had a matching index.

In step 406, the fingerprints retrieved via step 405 are matched against the input fingerprint to determine if any of the retrieved fingerprints match the input fingerprint.

In step 407, if there is a determination that none of the fingerprints retrieved from fingerprint database 352 match the input fingerprint, a "Not-found" is outputted. Meanwhile, if there is a determination that at least one of the fingerprints retrieved from fingerprint database 352 match the input fingerprint, the process proceeds to step 408.

In step 408, the text record corresponding to each database record with a fingerprint match is retrieved from text database 350.

In step 409, an appropriate full text matching is performed between the text records retrieved via step 408 and input text record.

In step 410, if none of the text records retrieved from text database 350 match the input text, a "Not Found" is outputted. On the other hand, if one or more text records retrieved from text database 350 match the input text, these records are output as search results.

According to the above search, it is ordinarily possible to improve search speed, because the number of fuzzy index matches gives an indication of the similarity. In particular, in some examples with the constraint that no full text matching is performed for any records having less than ½ of the index matches of the best matching database record, no reduction in the number of "founds" was observed, but the speed of search increased considerably.

V. Computer Readable Medium Implementation

The example embodiments described above such as, for example, the systems and procedures depicted in or discussed in connection with FIGS. 1 to 4, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 5:
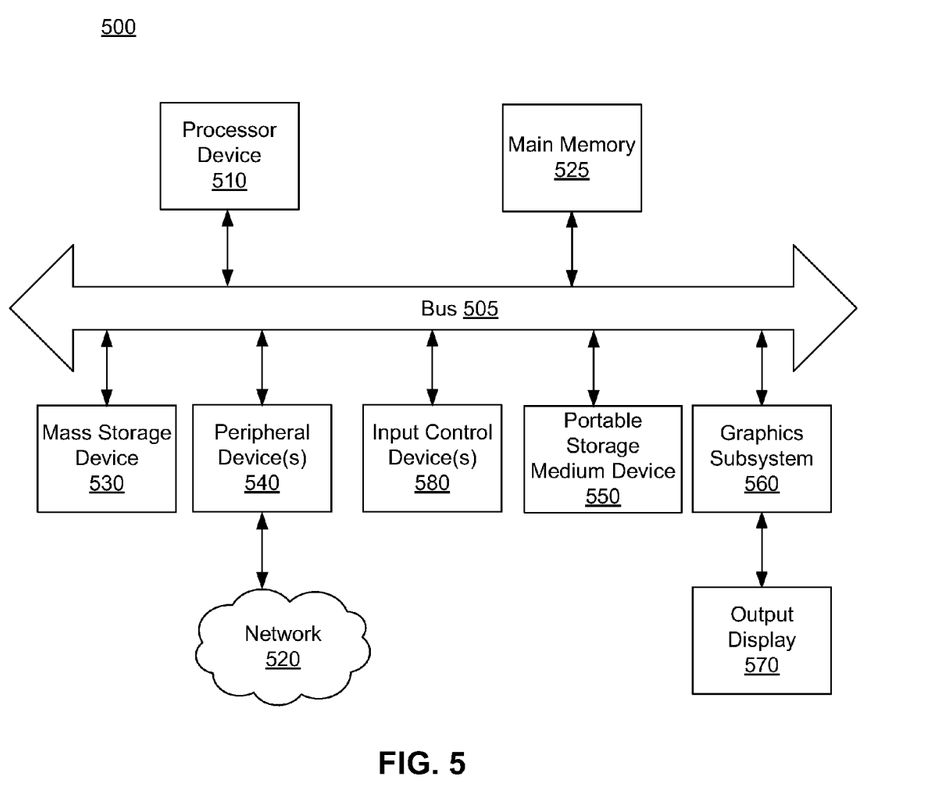
FIG. 5 is a block diagram of a computer for use with various example embodiments of the invention.

FIG. 5 is a block diagram of a general and/or special purpose computer 500, in accordance with some of the example embodiments of the invention. The computer 500 may be, for example, a user device, a user computer, a client computer and/or a server computer, among other things.

The computer 500 may include without limitation a processor device 510, a main memory 525, and an interconnect bus 505. The processor device 510 may include without limitation a single microprocessor, or may include a plurality of microprocessors for configuring the computer 500 as a multi-processor system. The main memory 525 stores, among other things, instructions and/or data for execution by the processor device 510. The main memory 525 may include banks of dynamic random access memory (DRAM), as well as cache memory.

The computer 500 may further include a mass storage device 530, peripheral device(s) 540, portable storage medium device(s) 550, input control device(s) 580, a graphics subsystem 560, and/or an output display 570. For explanatory purposes, all components in the computer 500 are shown in FIG. 5 as being coupled via the bus 505. However, the computer 500 is not so limited. Devices of the computer 500 may be coupled via one or more data transport means. For example, the processor device 510 and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 may be implemented, for example, with a magnetic disk drive or an optical disk drive. In a software embodiment, the mass storage device 530 is configured for loading contents of the mass storage device 530 into the main memory 525.

The portable storage medium device 550 operates in conjunction with a nonvolatile portable storage medium, such as, for example, a compact disc read only memory (CD-ROM), to input and output data and code to and from the computer 500. In some embodiments, the software for storing text records may be stored on a portable storage medium, and may be inputted into the computer 500 via the portable storage medium device 550. The peripheral device(s) 540 may include any type of computer support device, such as, for example, an input/output (I/O) interface configured to add additional functionality to the computer 500. For example, the peripheral device(s) 540 may include a network interface card for interfacing the computer 500 with a network 520.

The input control device(s) 580 provide a portion of the user interface for a user of the computer 500. The input control device(s) 580 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 500 may include the graphics subsystem 560 and the output display 570. The output display 570 may include a cathode ray tube (CRT) display and/or a liquid crystal display (LCD). The graphics subsystem 560 receives textual and graphical information, and processes the information for output to the output display 570.

Each component of the computer 500 may represent a broad category of a computer component of a general and/or special purpose computer. Components of the computer 500 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nano-systems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for performing a text-based fuzzy search, the method comprising:
   performing, by a processor, the steps of:
      receiving an input text record;
      computing, from the input text record, an input feature vector comprising one or more text features, each text feature including a subsequence of text characters and a frequency of occurrence of the associated subsequence of text characters;
      generating an input fingerprint out of the input feature vector by choosing one or more text features with non-zero frequencies and alphabetizing the text features chosen;
      generating one or more input indices by alphabetizing a plurality of text features in the input fingerprint and concatenating text features occurring in subsequent locations of the input fingerprint; and
      matching the input text record against a target text record if (1) one or more of the corresponding input indices match a target index corresponding to the target text record and (2) the corresponding input fingerprint matches a target fingerprint corresponding to the target text record, wherein the respective target text record is outputted as a search result if it matches the input text record.

2. The method of claim 1, further comprising:
   storing one or more target text records in a text database;
   computing a target feature vector for each target text record, each target feature vector comprising one or more target features, each target feature including a subsequence of characters and a frequency of occurrence of the associated subsequence of characters;
   generating a fingerprint for each target record out of the corresponding feature vector by choosing one or more features with non-zero frequencies and alphabetizing the features chosen;
   generating one or more indices for each target text record by concatenating two or more target features occurring in subsequent locations of the target fingerprint; and
   storing each target fingerprint in a fingerprint database and each target index in an index database.

3. The method of claim 1, wherein generating the target fingerprint includes a step of selecting one or more target features with non-zero frequencies.

4. The method of claim 3, wherein in the case that a respective target text record is over a set length threshold, only the K most frequently occurring target features are selected for the target fingerprint, with K being a number greater than 2.

5. The method of claim 3, wherein in the case that a respective target text record is over a set length threshold, a median or mean of the total frequency count of the target features is computed, and only target features with frequencies above the median or mean are selected for the target fingerprint.

6. The method of claim 1, wherein the input target text record is converted into a byte array representation prior to computation of the feature vector.

7. The method of claim 6, wherein subsequences of characters of the byte array representation are mapped to integer representations.

8. An apparatus for performing a text-based fuzzy search, the apparatus comprising at least one processor communicatively coupled to a communication network, wherein the processor is configured to:
   receive an input text record;
   compute, from the input text record, an input feature vector comprising one or more text features, each text feature including a subsequence of text characters and a frequency of occurrence of the associated subsequence of text characters;
   generate an input fingerprint out of the input feature vector by choosing one or more text features with non-zero frequencies and alphabetizing the text features chosen;
   generate one or more input indices by alphabetizing a plurality of text features in the input fingerprint and concatenating text features occurring in subsequent locations of the input fingerprint; and
   match the input text record against a target text record if (1) one or more of the corresponding input indices match a target index corresponding to the target text record and (2) the corresponding input fingerprint matches a target fingerprint corresponding to the target text record, wherein the respective target text record is outputted as a search result if it matches the input text record.

9. The apparatus of claim 8, wherein the processor is further configured to:
   store one or more target text records in a text database;
   compute a target feature vector for each target text record, each target feature vector comprising one or more target features, each target feature including a subsequence of characters and a frequency of occurrence of the associated subsequence of characters;
   generate a fingerprint for each target record out of the corresponding feature vector by choosing one or more features with non-zero frequencies and alphabetizing the features chosen;

generate one or more indices for each target text record by concatenating two or more target features occurring in subsequent locations of the target fingerprint; and store each target fingerprint in a fingerprint database and each target index in an index database.

10. The apparatus of claim 8, wherein generation of the target fingerprint includes a step of selecting one or more target features with non-zero frequencies.

11. The apparatus of claim 10, wherein in the case that a respective target text record is over a set length threshold, only the K most frequently occurring target features are selected for the target fingerprint, with K being a number greater than 2.

12. The apparatus of claim 10, wherein in the case that a respective target text record is over a set length threshold, a median or mean of the total frequency count of the target features is computed, and only target features with frequencies above the median or mean are selected for the target fingerprint.

13. The apparatus of claim 8, wherein the input target text record is converted into a byte array representation prior to computation of the feature vector.

14. The apparatus of claim 13, wherein subsequences of characters of the byte array representation are mapped to integer representations.

15. A non-transitory computer-readable storage medium having stored thereon sequences of instructions, which cause a processor to perform:
receiving an input text record;
computing, from the input text record, an input feature vector comprising one or more text features, each text feature including a subsequence of text characters and a frequency of occurrence of the associated subsequence of text characters;
generating an input fingerprint out of the input feature vector by choosing one or more text features with non-zero frequencies and alphabetizing the text features chosen;
generating one or more input indices by alphabetizing a plurality of text features in the input fingerprint and concatenating text features occurring in subsequent locations of the input fingerprint; and
matching the input text record against a target text record if (1) one or more of the corresponding input indices match a target index corresponding to the target text record and (2) the corresponding input fingerprint matches a target fingerprint corresponding to the target text record, wherein the respective target text record is outputted as a search result if it matches the input text record.

16. The computer-readable medium of claim 15, wherein the processor is further caused to perform:
storing one or more target text records in a text database;
computing a target feature vector for each target text record, each target feature vector comprising one or more target features, each target feature including a subsequence of characters and a frequency of occurrence of the associated subsequence of characters;
generating a fingerprint for each target record out of the corresponding feature vector by choosing one or more features with non-zero frequencies and alphabetizing the features chosen;
generating one or more indices for each target text record by concatenating two or more target features occurring in subsequent locations of the target fingerprint; and
storing each target fingerprint in a fingerprint database and each target index in an index database.

17. The computer-readable medium of claim 15, wherein generating the target fingerprint includes a step of selecting one or more target features with non-zero frequencies.

18. The computer-readable medium of claim 17, wherein in the case that a respective target text record is over a set length threshold, only the K most frequently occurring target features are selected for the target fingerprint, with K being a number greater than 2.

19. The computer-readable medium of claim 17, wherein in the case that a respective target text record is over a set length threshold, a median or mean of the total frequency count of the target features is computed, and only target features with frequencies above the median or mean are selected for the target fingerprint.

20. The computer-readable medium of claim 15, wherein the input target text record is converted into a byte array representation prior to computation of the feature vector.

21. A method for populating databases for a search, the method comprising:
performing, by a processor, the steps of:
storing one or more target text records in a text database;
computing a target feature vector for each target text record, each target feature vector comprising one or more target text features, each target text feature including a subsequence of text characters and a frequency of occurrence of the associated subsequence of text characters;
generating a fingerprint for each target text record out of the corresponding target feature vector by choosing one or more text features with non-zero frequencies and alphabetizing the text features chosen;
generating one or more indices for each target text record by concatenating two or more target text features occurring in subsequent locations of the target fingerprint;
storing each target fingerprint in a fingerprint database and each target index in an index database.

* * * * *